(12) United States Patent
Roman et al.

(10) Patent No.: US 6,221,497 B1
(45) Date of Patent: *Apr. 24, 2001

(54) LOW FRICTION COATED SUBSTRATE

(75) Inventors: Robert Roman, Woodmere, NY (US); James Wittig, Totowa, NJ (US)

(73) Assignee: Tekkote Corporation, Leonia, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/921,850

(22) Filed: Sep. 2, 1997

(51) Int. Cl.⁷ .............................. B32B 27/14; B32B 3/00
(52) U.S. Cl. ..................... 428/447; 428/336; 428/413; 428/537.5
(58) Field of Search .......................... 428/413, 447, 428/375, 446, 195, 220, 213, 336, 537.5; 427/385.5; 522/170, 148, 134; 528/25, 421, 405

(56) References Cited

U.S. PATENT DOCUMENTS

| | | | |
|---|---|---|---|
| 4,057,657 | * 11/1977 | Garnett et al. | 427/44 |
| 4,069,054 | * 1/1978 | Smith | 96/115 |
| 4,231,951 | * 11/1980 | Smith et al. | 260/446 |
| 4,268,580 | * 5/1981 | Rock et al. | 428/423.4 |
| 4,486,577 | * 12/1984 | Mueller et al. | 525/474 |
| 4,547,431 | * 10/1985 | Eckberg | 428/413 |
| 4,587,169 | * 5/1986 | Kistener | 428/413 |
| 5,120,811 | * 6/1992 | Glotfelter et al. | 528/25 |
| 5,371,058 | * 12/1994 | Witting, Jr. et al. | 503/206 |
| 5,658,661 | * 8/1997 | Mitchell, Jr. et al. | 428/352 |
| 5,931,803 | 8/1999 | Jackson | 604/15 |

* cited by examiner

*Primary Examiner*—Bruce H. Hess
*Assistant Examiner*—B. Shewareged
(74) *Attorney, Agent, or Firm*—Stroock & Stroock & Lavan LLP

(57) ABSTRACT

A coated substrate and method of forming the substrate are provided. The substrate can have high gloss and good slip properties. Such a substrate can be formed with a paper base having a coating thereon. The coating can include an active silicone-based slip agent and other suitable ingredients.

29 Claims, 1 Drawing Sheet

LOW FRICTION COATED SUBSTRATE

BACKGROUND OF THE INVENTION

The invention relates generally to coated substrates and more particularly to a low friction coated substrate which can be used to form applicators for tampons and other useful objects.

One conventional apparatus for inserting a tampon involves the use of a paper based tube having a tampon stored therein. The tube is inserted in place and the tampon pushed therefrom. However, many users find this conventional tampon applicator to be unsatisfactory in terms of ease of insertion and appearance. An alternative applicator is formed of plastic and has a glossy finish, suggesting low friction. However, such applicators are perceived to have environmental problems.

Accordingly, it is desirable to provide an improved low friction material which can be used to form a tampon applicator or other useful objects, which overcome drawbacks of the prior art.

SUMMARY OF THE INVENTION

Generally speaking, in accordance with the invention, a coated substrate and method of forming the substrate are provided. The substrate can have high gloss and good slip properties. Such a substrate can be formed with a paper base having a high slip coating thereon. The coating can include an active silicone-based slip agent and other suitable ingredients. The final product can exhibit a static coefficient of friction less than or equal to 0.4 $gr_f/gr_w$ and a kinetic coefficient of friction less than or equal to 0.05 $gr_f/gr_w$ and is well suited to be formed into a tampon applicator.

Accordingly, it is an object of the invention to provide an improved coated substrate.

Another object of the invention is to provide an improved method of forming the material, to be used as a coated substrate;

Yet another object of the invention is to provide an improved material and method for forming the material to be used as an applicator for a tampon.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description, taken in connection with the accompanying drawings, in which.

DETAILED DESCRIPTION OF THE PREFERRED EMBODIMENTS

Figure 1:
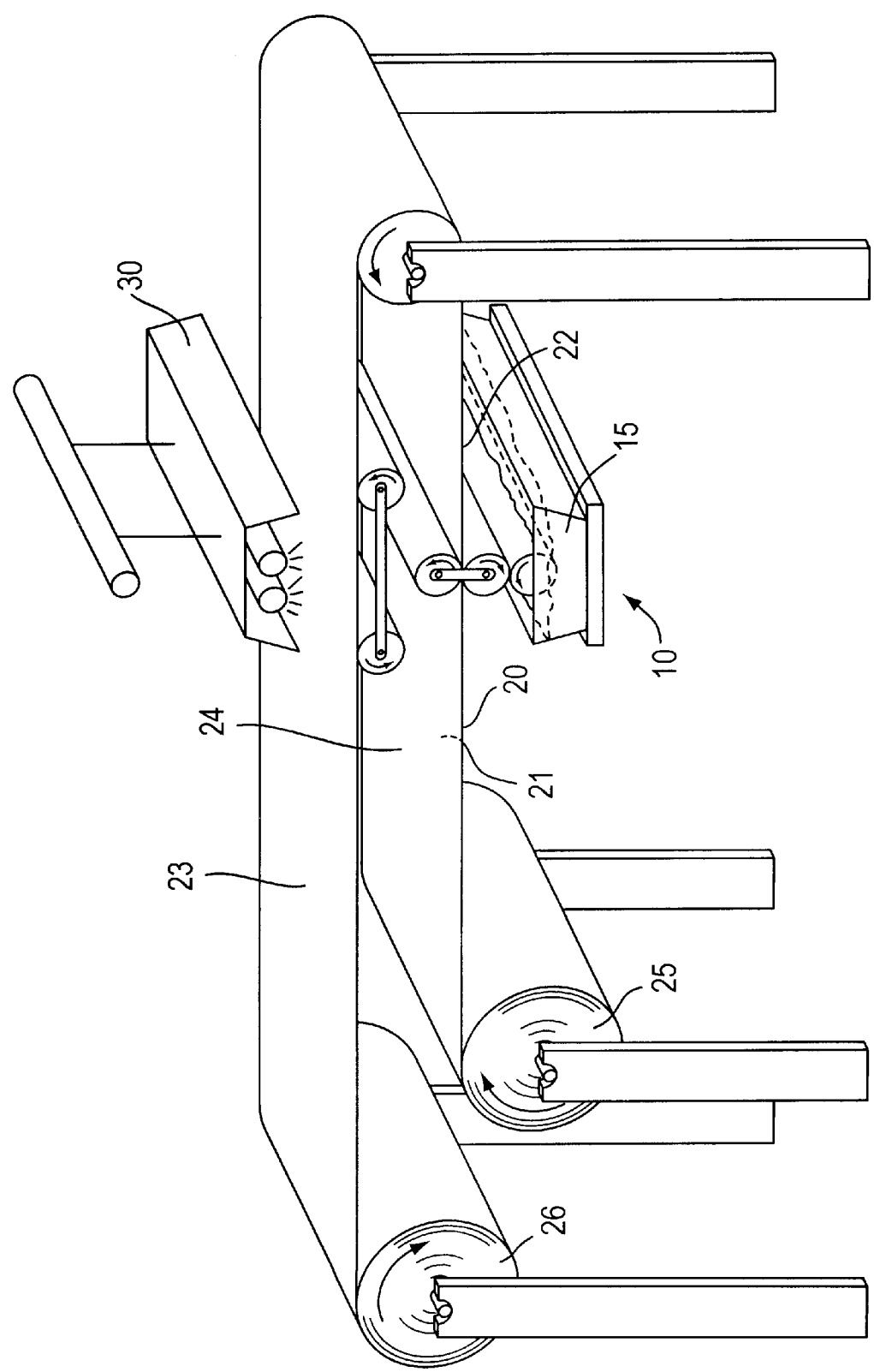
FIG. 1 is schematic perspective view of an apparatus for coating a substrate in accordance with an embodiment of the invention.

Coated substrates in accordance with the invention should have low friction, a high glossy appearance and/or suitable biodegradable properties. Accordingly, paper based, including cardboard-type or stiff paper-stock substrates which are conveniently rolled into tube shapes and which can be maintained in such shape with the use of adhesive or otherwise are desirable.

An advantageous attribute of the coating includes meeting the 0.5 $mg/in^2$ extractable limit set forth in 21 CFR §175.300. The coating material should have good adhesion to paper products, fast UV curing, high gloss, a clear non-yellow appearance and low friction high slip properties.

A preferred method applies UV curable resins, such as cationic epoxy based formulations to paper-based substrates. UV coating provides a low cost convenient method, compared to various lamination methods, in which a layer of material is adhered to a paper base with adhesive or otherwise.

A high gloss and slip waterborne coating can also be used. A disadvantage of waterborne coating systems is that the gloss and slip qualities are not as high as that achieved with UV curing. Electron beam curing of monomers and resins can also be suitable, although this coating method requires relatively expensive equipment. However, the resulting product can achieve very high gloss and slip with very low extractable levels. Solvent based acrylic or urethane coatings and the extrusion coating of a hot-melt polymer material can also be suitable.

Preferred resins include UV curable epoxy resin prepolymers. One particularly suitable UV curable epoxy resin pre-polymer is 3,4 epoxy-cyclohexyl-methyl-3,4 epoxy-cyclohexyl carboxylate. This material has fast UV reactivity and low odor and extractable properties upon curing. Other cycloaliphatic epoxy resins can be suitable, particularly the class of resins including bis(3,4-epoxy cyclohexyl) adipate, vinyl cyclohexene dioxide, vinyl cyclohexene monoxide and limonene dioxide. These three resins have acceptable hardness, but are relatively low in viscosity and can permeate into certain paper substrates before or during UV curing. The resin component of the composition can be included as about 80 to 98%, more preferably about 88 to 92% of the coating composition.

The molecular structure of these cycloaliphatic epoxides are set forth below in Table 1.

TABLE 1

Cycloaliphatic Expoxides

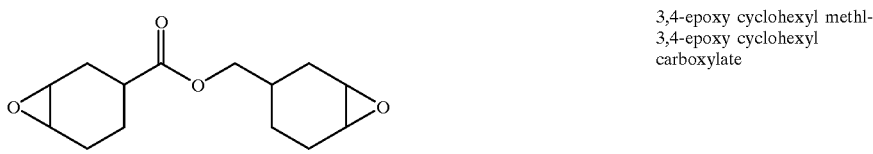

3,4-epoxy cyclohexyl methl-3,4-epoxy cyclohexyl carboxylate

TABLE 1-continued

Cycloaliphatic Epoxides bis(3,4-epoxy cyclohexyl) adipate 1,2-epoxyhexadecane vinyl cyclohexene monoxide vinyl cyclohexene monoxide A second advantageous ingredient of the coating is a flexible resin modifier, such as diol chain extenders, which impart flexibility to the formulation. A particularly useful modifier is 2-oxepanone polymer with 2-ethyl-2 (hydroxymethyl)-1,3 propanediol. This material is slow reacting and if added at levels above about 6 percent, can unacceptably increase the extractable property of the cured material above the limit of 0.5 mg/in$^2$, specified in 21 CFR §175.300. Modifiers should be included as not more than about 10% of the composition, more preferably about 4–6%.

It is also advantageous to include a slip additive, such as a reactive silicone slip additive, to the formulation. Such material imparts an important slip characteristic to the finished coating. Preferred slip additives are hydroxy functional, so that they can react with the epoxy resin and minimize extractability. If too little of this material is added, it will not impart sufficient slip. If too much is added, it will not react sufficiently, which can increase extractables. A particularly useful slip additive is polydimethyl siloxane-diol. It can be added as about 0.1% to 5.0% of the coating, more preferably about 1.0 to 2.0%.

It is also advantageous to include a photoinitiator which will absorb UV energy, and decompose into a Lewis Acid complex. This can then initiate homopolymerization of the epoxy resin. A particularly suitable ingredient is mixed triarylsulfonium hexafluorantimonate salts. If insufficient photoinitiator is included, production speeds can be undesirably lowered. Excess initiator can be undesirable and increases extractables. This initiator is available in a 50:50 solution with propylene carbonate. It is preferably included as 0.3 to 5% of the coating composition, more preferably 0.8 to 1.2%.

Standard bis-phenol epoxy resins and epoxy novalacs can also be used as extenders or modifiers to replace at least part of the cycloaliphatic resin. However, these resins will have a slowing effect on cure response and can also increase the extractables.

Alternate formulas using an acrylate monomer or resin to replace at least a portion of the epoxy material can also be used.

The following example was prepared by stirring the ingredients of Table 2 to obtain a homogeneous dispersion. A suitable mixing time is 5 minutes. Mixing can be performed with adjustable or fixed speed mixers and high or low shear impellers.

TABLE 2

| Ingredient | Actual % | Optional Range |
|---|---|---|
| 1. 3,4 epoxy-cyclohexyl-methyl-3,4-epoxy-cyclohexyl carboxylate | 90.9 | 80–98 |
| 2. 2-oxepanone, polymer with 2-ethyl-2(hydroxymethyl)-1,3 propanediol | 5.6 | 0.0–10 |
| 3. Polydimethyl siloxan-diol | 1.5 | 0.1–5 |
| 4. Mixed Triarylsulfonium Hexafluoroantimonate Salts | 1.0 | 0.3–5 |
| 5. Propylene Carbonate | 1.0 | 0.3–5 |

Coating can be performed by direct gravure (direct or reversed angle) three roll offset gravure (direct or reverse angle), Meir Rod, Flexo configuration, or multiple roll-differential offset gravure. In each of these, the wet coating solution should be applied to a substrate in an even coat. The substrate can be formed of various materials, as desired, such as paper, cardboard, polymer films, metal substrates or combinations of each of these. The amount of coating to be applied per unit of measurement of substrate will be a function of the amount of gloss desired and the use of the substrate. Coating can be provided completely across the surface of the substrate or portions thereof can be left uncoated. For example, in a preferred embodiment of converting the coated substrate into a tampon applicator, a strip of the substrate surface is left uncoated, in order to provide a base for an adhesive used to maintain the coated substrate in roll form.

One method of forming coated substrates in accordance with an embodiment of the invention is shown generally with reference to FIG. 1. A coating composition 15 is supplied to a container 10 by a continuous flow or intermittent type of pump. An uncoated substrate 20 is unrolled from a feed roll 25 and then passes through a coating section 10, where a UV curable (or other type) material 15 is coated on a first side 21 thereof. Thereafter, uncured coated substrate 22 travels through a curing station, such as UV curing station 30, to yield a substrate covered with a cured coating 23, where it is rolled onto a take up roll 26.

Coated substrates in accordance with the invention can have extractables values below 5 mg/m$^2$. Other attributes include a kinetic coefficient of friction below 0.10, preferably below 0.06 and even below 0.04. The staticcoefficient of friction value will be substantially the same or slightly higher. Coefficient of friction ("COF") can be measured by pulling a sample holder at a constant speed, such as 0.5 ft/min±0.1 ft/min, while measuring force needed: (a) to initiate movement (static COF); and (b) to maintain movement at the constant speed. Kinetic force can be measured with an instron tester. A sample holder can be a 2.5"×2.5"× 0.25" high steel sled. The test surface should be kept clean of dust. Also, plastic films can have different COFs when tested in different directions and the lowest value, or the value in the direction of actual usage can be used.

The substrate can have virtually any thickness. Examples of paper substrates have thicknesses of 1.45 to 1.85 mils and/or a coating thicknesses of 0.2 to 0.3 mils and/or a density of 1.117 g/cm$^3$.

It will thus be seen that the objects set forth above among those made apparent from the preceding description, are efficiently attained and, since certain changes may be made in carrying out the above method and in the article set forth without departing form the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A coated substrate, comprising:
   a substrate having a coating thereon, the coating formed from coating material formed with at least a curable pre-polymer resin and about 0.1 to 5 percent reactive silicone slip agent dispersed therein.

2. The coated substrate of claim 1, wherein the curable resin is a UV curable resin.

3. The coated substrate of claim 1, wherein the resin is a UV curable cyclo-aliphatic epoxy resin.

4. The coated substrate of claim 1, wherein the curable resin is 3,4-epoxy-cyclohexyl-methyl-3,4-epoxy-cyclohexyl carboxylate resin.

5. The coated substrate of claim 1, wherein the resin is selected from the group consisting of, 3,4-epoxy cyclohexyl methl-3,4-epoxy cyclohexyl carboxylate, bis(3,4-epoxy cyclohexyl) andipate, 1,2-epoxyhexadecane, vinyl cyclohexene monoxide and combinations thereof.

6. The coated substrate of claim 1, wherein the coating material is prepared with 80–98 percent UV curable cycloaliphatic epoxy resin.

7. The coated substrate of claim 1, wherein the coating material is prepared with 88–92 percent UV curable cycloalaphitic epoxy resin.

8. The coated substrate of claim 1, wherein the coating material includes diol chain extender in sufficient amount to increase the flexibility of the cured coating.

9. The coated substrate of claim 8, wherein the diol chain extender is included as not greater than about 10 percent of the coating material composition.

10. The coated substrate of claim 8, wherein the diol chain extender is included as not greater than about 5–6 percent of the coating material composition.

11. The coated substrate of claim 1, wherein the coating material is prepared with about 10 or less percent 2-oxepanone, polymer with 2-ethyl-2(hydroxymethyl)-1,3 propanodiol.

12. The coated substrate of claim 1, wherein the reactive silicone slip agent is a siloxane-diol slip agent.

13. The coated substrate of claim 1, wherein the coating material is prepared with between about 1 and 2 percent reactive silicone slip agent and 80–98% UV curable epoxy resin.

14. The coated substrate of claim 1, wherein the reactive silicone slip agent is included as between about 1 and 2 percent of the coating material.

15. The coated substrate of claim 1, wherein the coating material includes about 1 to 2 percent polydimethyl siloxane-diol.

16. The coated substrate of claim 7, wherein the coating material includes about 1 to 2 percent polydimethyl siloxane-diol.

17. The coated substrate of claim 12, wherein the coating material includes about 1 to 2 percent polydimethyl siloxane-diol.

18. The coated substrate of claim 17, wherein the coating material includes about 0.3 to 5% photoinitiator.

19. The coated substrate of claim 17, wherein the coating material includes about 1 to 2 percent triarylsulfonium hexafluoroantimonate salt.

20. The coated substrate of claim 1, wherein the substrate is paper stock 1.45 to 1.85 mils thick and the cured coating has a thickness of 0.2 to 0.3 mils.

21. The coated substrate of claim 20, wherein the substrate has a kinetic COF of less than 0.10.

22. The coated substrate of claim 20, wherein the substrate has a kinetic COF of less than 0.06.

23. The coated substrate of claim 20, wherein the substrate has a kinetic COF of less than 0.04.

24. A coated substrate, comprising:
   a substrate having a coating thereon, the coating formed from coating material formed with at least 80–98 percent UV curable cycloaliphatic epoxy resin and an active silicone slip agent dispersed therein.

25. The coated substrate of claim 24, wherein the coating material is prepared with 88–92 percent UV curable cycloalaphitic epoxy resin.

26. The coated substrate of claim 25, wherein the coating material is prepared with between about 0.1 and 5 percent reactive silicone slip agent.

27. The coated substrate of claim 25, wherein the reactive silicone slip agent is a siloxane-diol slip agent.

28. The coated substrate of claim 27, wherein the substrate is paper stock 1.45 to 1.85 mils thick and the cured coating has a thickness of 0.2 to 0.3 mils.

29. A coated substrate, comprising:
   a substrate having a coating thereon, the coating formed from coating material formed with a composition comprising: 80–98% of 3,4 epoxy-cyclohexyl-methyl-3,4-epoxy-cyclohexyl carboxylate; 0.0–10% of 2-oxepanone polymer with 2-ethyl-2(hydroxymethyl)-1,3 propanediol; and 0.1–5% of polydimethyl siloxane-diol.

* * * * *